United States Patent [19]

Duffty et al.

[11] Patent Number: 5,027,737
[45] Date of Patent: Jul. 2, 1991

[54] AMPHIBIOUS HYDROFOIL VEHICLE

[75] Inventors: Bryan Duffty, Gilrov; Waldo E. Rodler, Jr., San Jose; Hans F. Woehrmann, Los Gatos, all of Calif.

[73] Assignee: FMC Corporation, Chicago, Ill.

[21] Appl. No.: 369,173

[22] Filed: Jun. 21, 1989

[51] Int. Cl.⁵ .............................................. B63B 35/00
[52] U.S. Cl. ..................................... 114/270; 114/282
[58] Field of Search ......... 114/270, 274, 278, 280–283; 440/38–43, 95–97

[56] References Cited

U.S. PATENT DOCUMENTS

| | | | |
|---|---|---|---|
| 3,027,862 | 4/1962 | Votre | 114/270 |
| 3,420,204 | 1/1969 | Samuel | 114/270 |
| 3,487,802 | 1/1970 | Roy | 114/270 |
| 3,809,005 | 5/1974 | Rodler, Jr. | 440/40 |
| 4,073,257 | 4/1978 | Rodler, Jr. | 440/40 |

FOREIGN PATENT DOCUMENTS 1559402  3/1969  France ................................. 440/40

OTHER PUBLICATIONS

An article entitled Hydrofoil appearing on pp. 426–428 of vol. 12 of Collier's Encyclopedia, published by Crowell, Collier and MacMillan, Inc., in 1966.

*Primary Examiner*—Jesus D. Sotelo
*Attorney, Agent, or Firm*—A. J. Moore; R. C. Kamp; R. B. Megley

[57] ABSTRACT

A power driven tracked amphibious vehicle is disclosed for moving troops from ships to shore at speeds in excess of 25 miles per hour. The vehicle includes a pair of hydrofoil assemblies each pivoted to the vehicle for movement between an operative water mode position with the hydrofoils and inline water jet propulsion units submerged in water for propelling the vehicle while in water, and a land mode with the hydrofoils and water jet propulsion units raised above the tracks for propelling the vehicle on land. When in the water mode the tracks are raised a short distance, and the track covers and bow flaps are positioned below the tracks for minimizing drag on the vehicle.

25 Claims, 5 Drawing Sheets

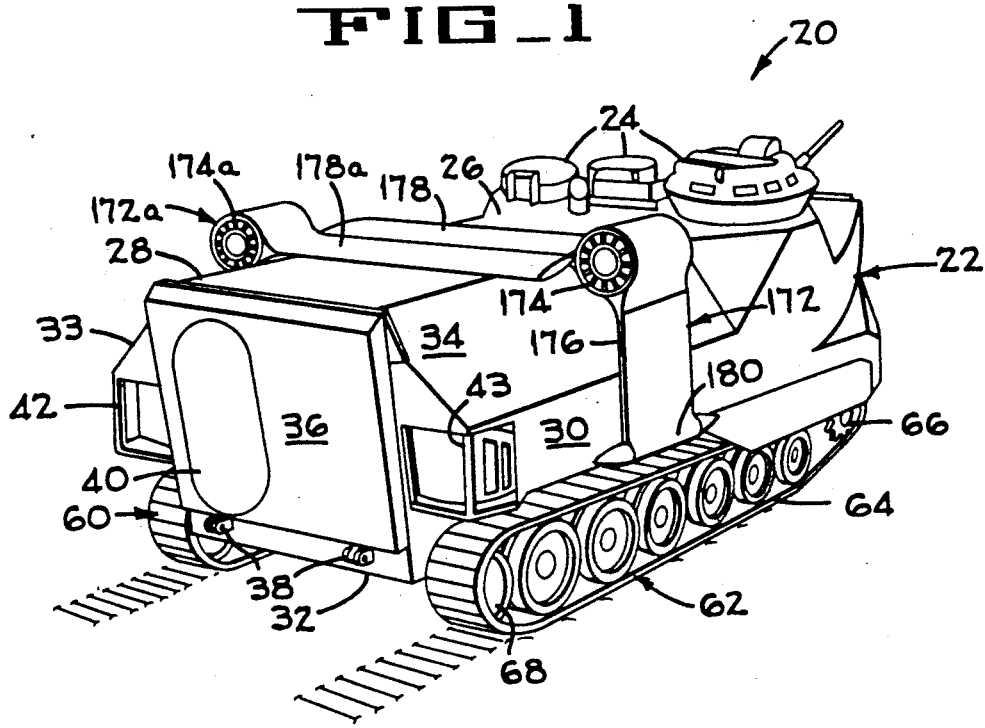
FIG_1
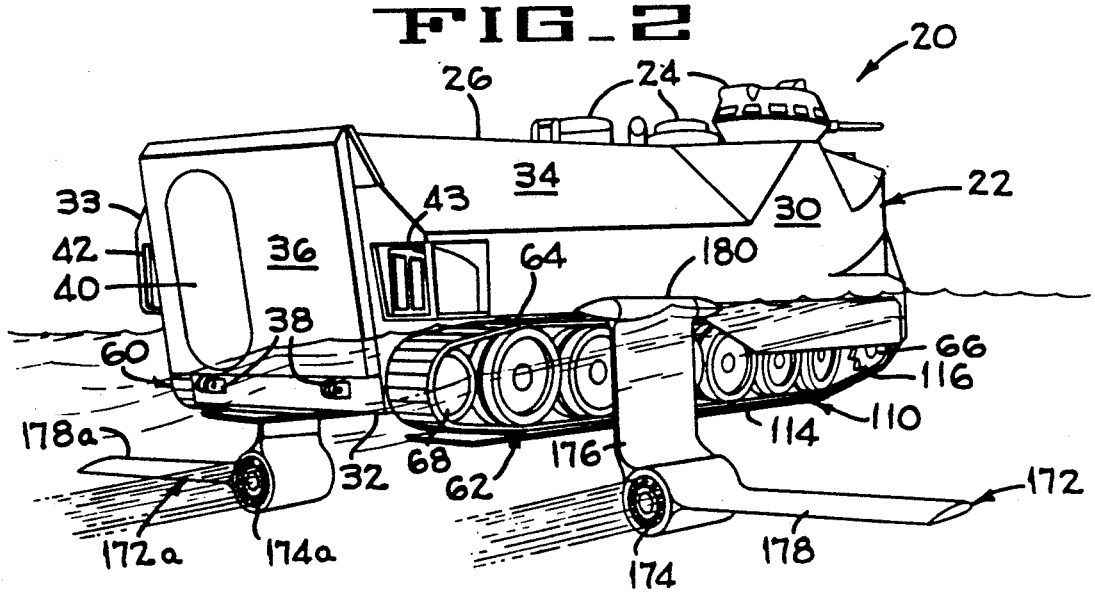
FIG_2

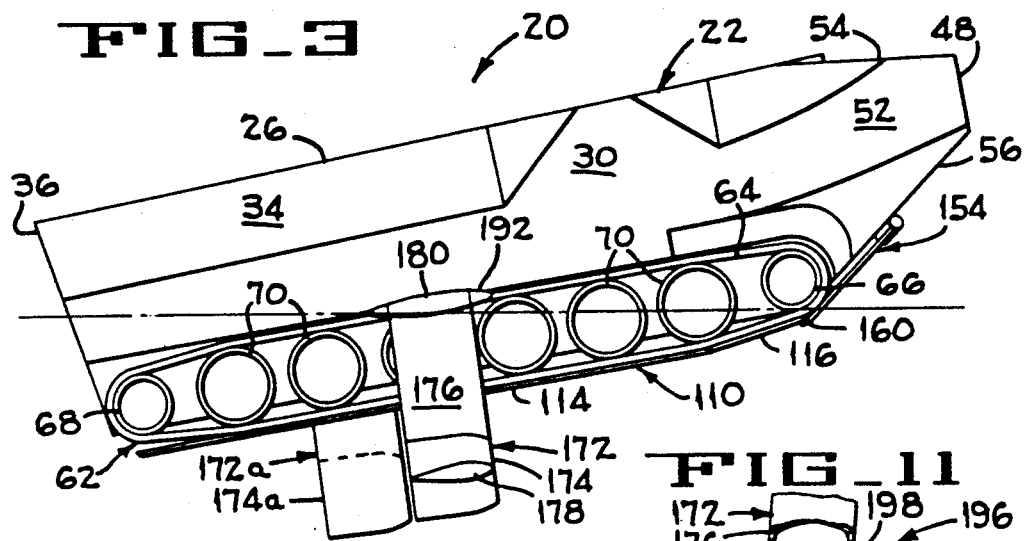
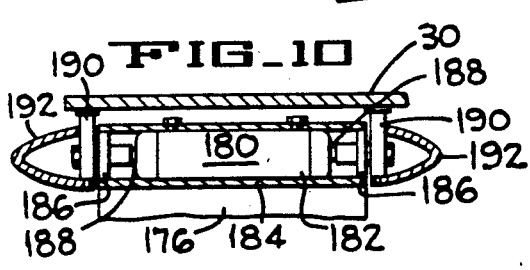
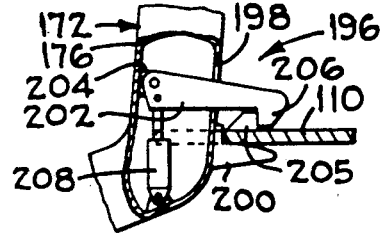
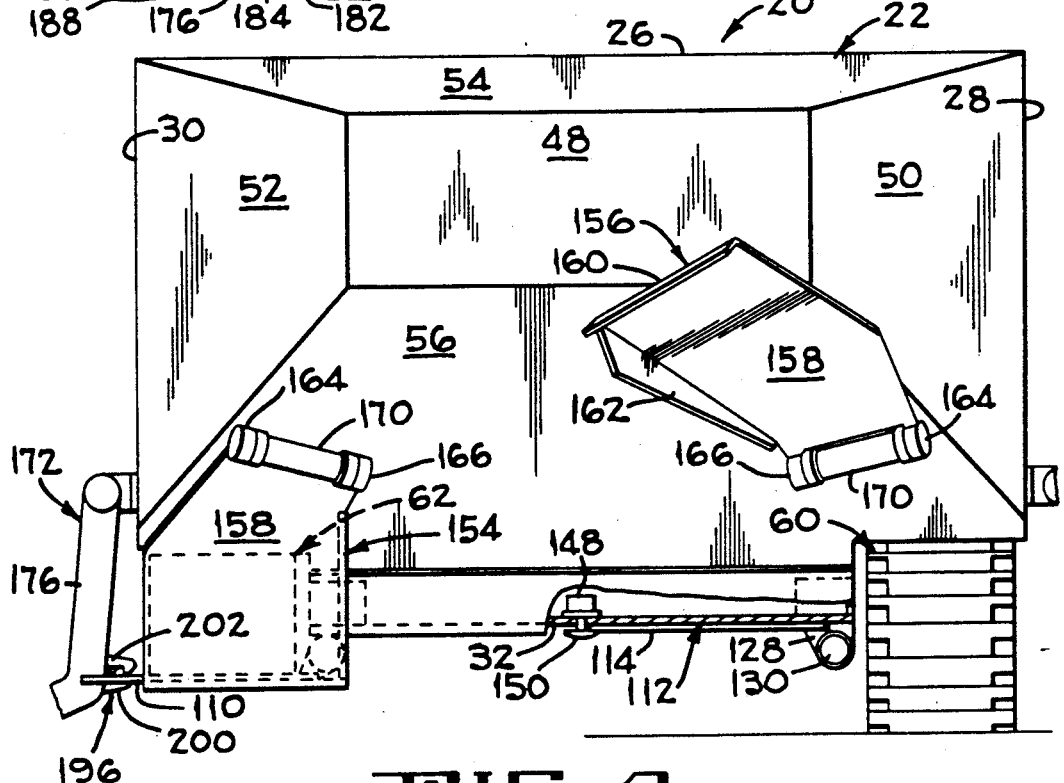

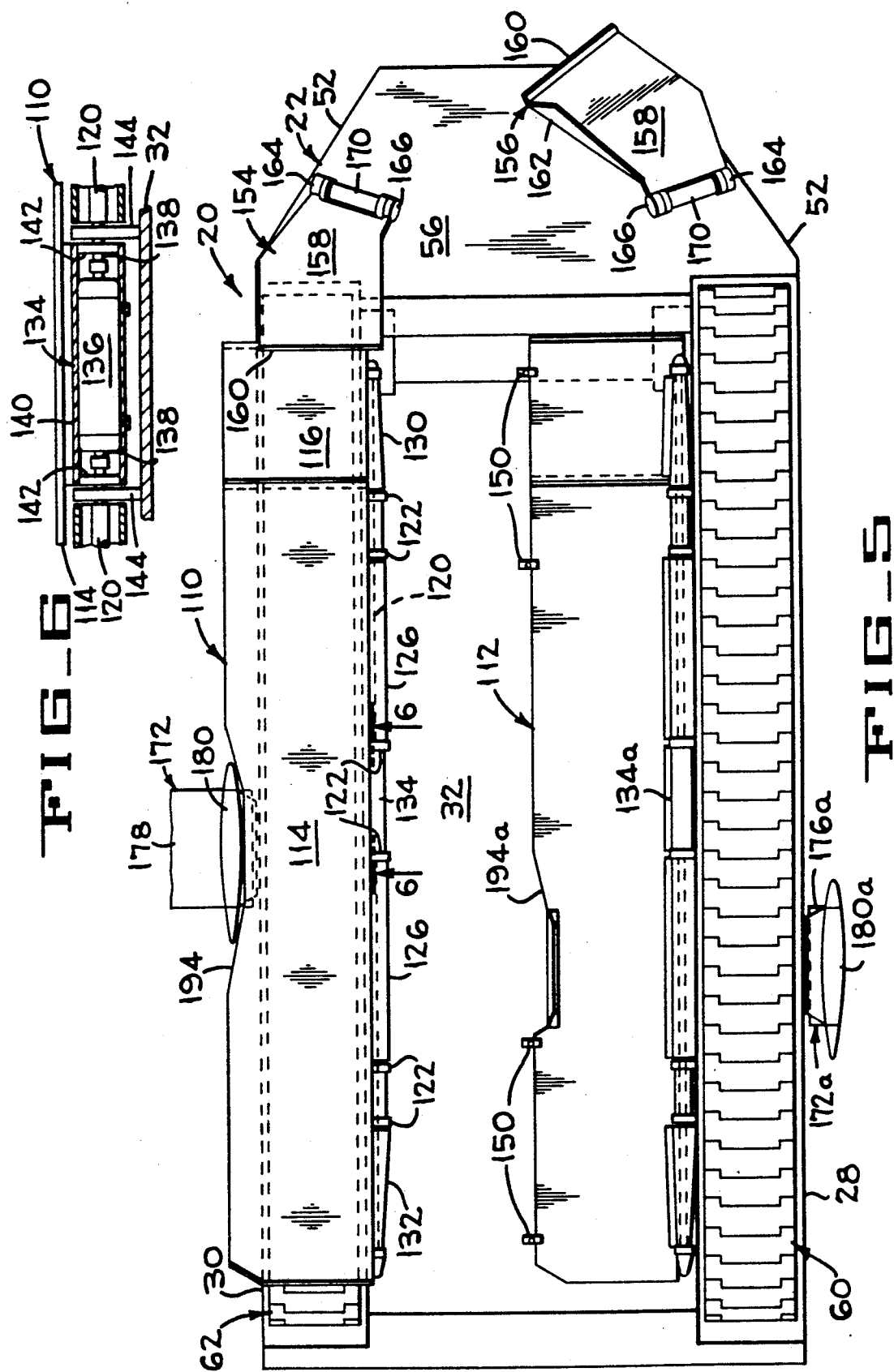

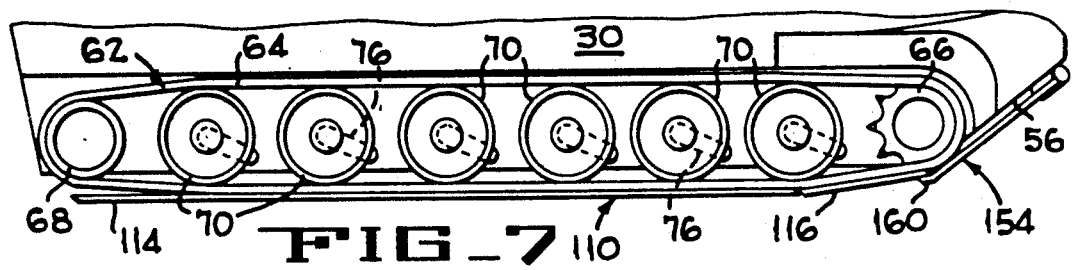
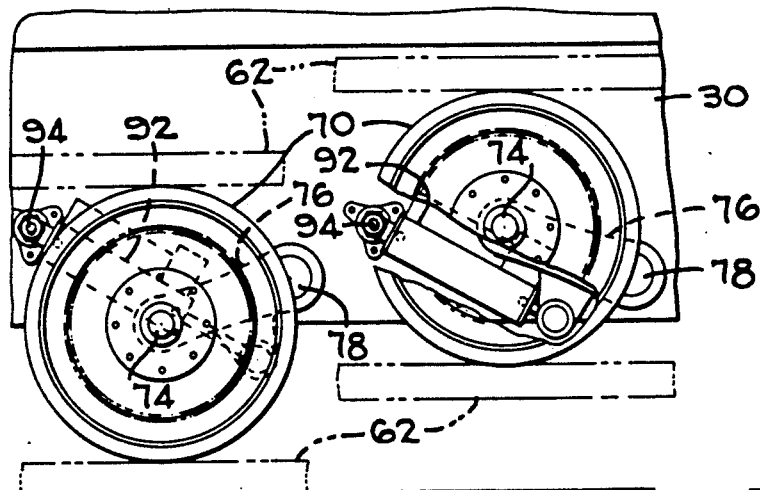
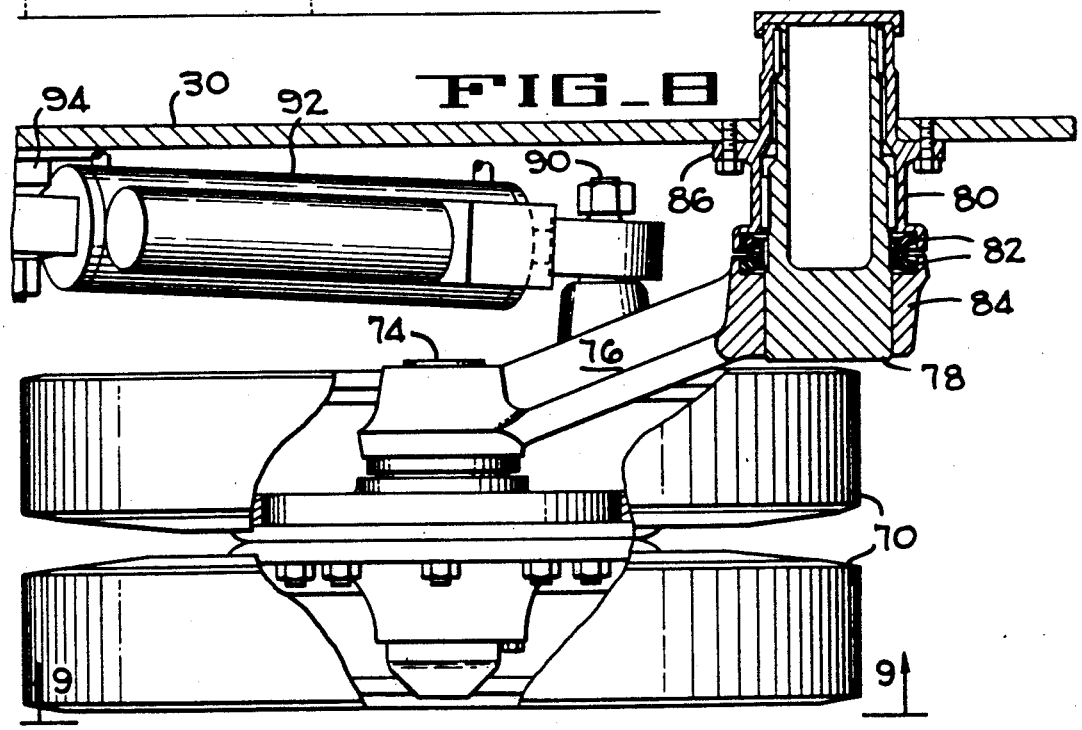

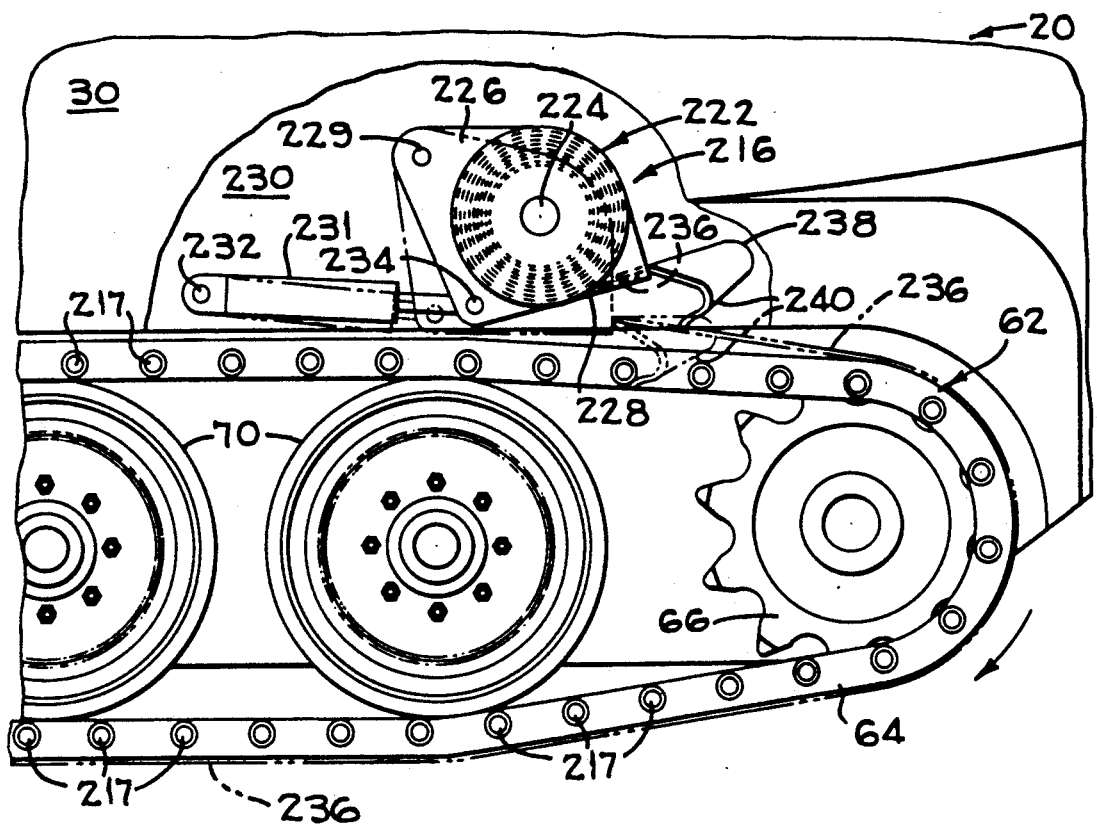
FIG_12
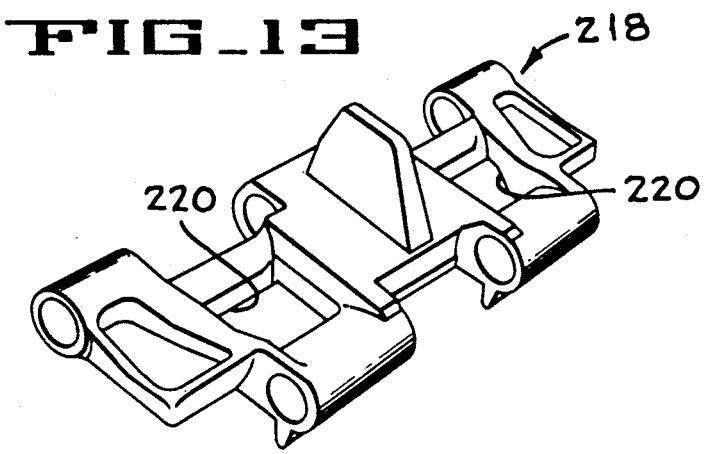
FIG_13

AMPHIBIOUS HYDROFOIL VEHICLE

CROSS REFERENCE TO RELATED APPLICATION

The present application relates to Rodler, Jr. Application Ser. No. 369,179 filed on June 21, 1989 entitled WATER JET PROPULSION MODULE which is presently assigned to the Assignee of the present invention.

BACKGROUND OF THE INVENTION

1. Field of the Invention

The present invention relates to amphibious vehicles and more particularly relates to an assault amphibious vehicle driven by a pair of water jet propulsion modules each connected between a support arm and a hydrofoil and movable between a stowed position preferably over the top of the vehicle, and a lowered position with the hydrofoils and propulsion modules submerged in water and capable of propelling the vehicle faster than at least 20 miles per hour.

2. Description of the Prior Art

Assignee's U.S. Samuel Pat. No. 3,420,204 discloses a water jet reactive propulsion system which is capable of propelling tracked amphibious vehicle through water at slow speeds of about ten miles per hour.

U.S. Rodler Jr. Pat. Nos. 3,809,005 and 4,073,257 disclose two versions of water jet propulsion systems wherein the water intake ducts and the water discharge ducts are connected by passages that require two 180° reversals of direction of the propulsion water.

The major disadvantages of the prior art water jets are their relative low propulsion efficiencies due in part to angular changes in direction of the water flow through the prior art systems.

SUMMARY OF THE INVENTION

The amphibious vehicle of the present invention is preferably a tracked military vehicle which must be propelled at speeds in excess of 20 miles per hour to make safe beach landings. A pair of linear flow water jet propulsion units are mounted on hydrofoils which are pivotally mounted on opposite sides of a vehicle for movement between a position submerged in the water for propelling the vehicle through the water, to a land transport position disposed above the vehicle at which time the vehicle is propelled by its ground engaging tracks. The preferred embodiment of the vehicle weighs about 30 tons, and the hydrofoils are preferably designed to provide a lift in excess of one-half that amount or about 15 tons when traveling in excess of 20 miles per hour.

BRIEF DESCRIPTION OF THE DRAWINGS

FIG. 1 is a diagrammatic perspective of an amphibious vehicle as it appears when supported on the ground.

FIG. 2 is a diagrammatic perspective of the amphibious vehicle when moving through water, with the water jet module and wings being submerged and further illustrating pivotal track covers positioned below the tracks for minimizing water friction.

FIG. 3 is a diagrammatic side elevation of a vehicle floating in water prior to being propelled to a speed in excess of 20 miles per hour.

FIG. 4 is a front elevation of the vehicle illustrating the left track in a ground supporting position or mode, and the right track in a raised position or water mode, and a left track cover and bow cover in their land mode positions and having a right track cover and a bow cover in their water mode.

FIG. 5 is a bottom view of FIG. 4 illustrating the vehicle components on the right side of the vehicle positioned in the water mode and the components on the left side of the vehicle positioned in the land mode.

FIG. 6 is a section taken along lines 6—6 of FIG. 5 illustrating a motor assembly for raising and lowering the right track cover.

FIG. 7 is a side elevation of the right track when in its elevated water mode position.

FIG. 8 is a horizontal section of one of the road wheels and a wheel supporting system including a pivot shaft and a hydraulic cylinder with a buffer.

FIG. 9 is a section looking in the direction of arrows 9—9 of FIG. 8 illustrating a buffered hydraulic cylinder for selectively moving two of the road wheels of the right track between the lowered land mode and the raised water mode positions.

FIG. 10 is a horizontal section taken through a fragment of one side wall of the vehicle and a motor for raising and lowering the associated hydrofoil assembly between its land and water mode positions.

FIG. 11 is a diagrammatic vertical section through a tubular support leg of one of the hydrofoil assemblies illustrating a hydrofoil latching assembly for mechanically latching the hydrofoil in its water mode.

FIG. 12 is a side elevation of a modified form of a track covering system for minimizing drag when the vehicle is moving through the water at high speeds.

FIG. 13 is a perspective of a track shoe as it appears when in the lower run of one of the tracks of the amphibious hydrofoil vehicle.

DESCRIPTION OF THE PREFERRED EMBODIMENT

As indicated in FIGS. 1-5, the preferred embodiment of the amphibious hydrofoil vehicle 20 is illustrated as an armored-personnel or cargo carrier. The vehicle includes a water tight body 22 having a plurality of hatches 24 on a roof 26. Side walls 28,30 are welded in water tight engagement to the roof 26 and to a bottom planing hull or floor 32. The upper portions of the side walls 28,30 are angled inwardly and upwardly at 33,34. A ramp 36 (FIGS. 1 and 2) is pivotally supported on the rear end of the vehicle by hinges 38 and is movable between the illustrated closed position and an open position with the upper end resting on the ground for handling large pieces of cargo. A small personnel door 40 is pivotally connected to the ramp 36 by conventional hinges, and a latch is provided to lock the door when in the position shown in FIGS. 1 and 2. When closed, the ramp 36 and door 40 are sealed in watertight engagement to the body 22 by means (not shown) as is conventional in the art. A pair of transition jets 42 and 43 are mounted in the rear and side walls of the vehicle for aiding in steering the amphibious vehicle 20.

The front of the amphibious vehicle 20 (FIGS. 3 and 4) includes a blunt front wall 48, tapered side walls 50,52, a tapered top wall 54 and a tapered bottom wall 56 which blends into the bottom planing floor 32.

The illustrated amphibious vehicle 20 (FIGS. 1, 2 and 4) is in the form of a tracked vehicle having a power drive endless left track assembly 60 and a power driven right track assembly 62. As shown in FIGS. 4 and 5, the left track assembly is illustrated in its ground engaging mode, while the right track assembly is in a retracted amphibious mode.

When the amphibious vehicle 20 is in high waterspeed mode as indicated in FIGS. 2, 3 and 7, the endless track assemblies 60,62 are both raised about 9 inches from their normal ground support position for minimizing water drag while being propelled through the water.

FIGS. 7, 8 and 9 illustrate the track supporting components on the right or starboard track assembly 62. The track assembly 62 includes an endless track 64 trained around a drive sprocket 66, an idler sprocket 68, and a plurality of roadwheels 70. The drive sprocket 66 is journaled on the vehicle body and is operatively connected to power means and transmission means (not shown) within the vehicle. The road wheels 70 are positioned between the drive sprocket 66 and the idler sprocket 68. Each road wheel 70 is journaled on a spindle 74 connected to a rocker arm 76 that is secured to a stub shaft 78 journaled in a water tight housing 80. Suitable seal rings 82 are disposed between the housing 80 and a hub 84 of the road arm 76 to maintain the water tight seal. The water tight housing includes a mounting flange 86 bolted to the adjacent side wall 30 or 28 of the vehicle.

In order to minimize drag when the amphibious hydrofoil vehicle 20 (FIG. 2) is in high waterspeed mode, the road wheels 70 are raised about 9 inches above their land mode positions as illustrated in FIGS. 2, 3 and 7.

Having reference to FIGS. 7–9, the road arms 76 which connects the associated road wheel 70 to its stub shaft 78 includes a pin 90. A buffered hydraulic cylinder 92 is pivotally connected between the pivot pin 90 and a second pivot pin 94 that is secured to the lower portion of the adjacent side wall 30. When the amphibious vehicle is being placed in high waterspeed mode, hydraulic fluid is directed into each of the buffered hydraulic cylinders 92 (only one being shown in FIG. 8) for raising all road wheels about 9 inches from their land mode as indicated at the right in FIG. 9. When in the land mode, the several cylinders allow each road wheel to independently move up and down when contacting a large rock or the like on the vehicle supporting surface.

The left track assembly is similar to that of the right track and accordingly will not be described in detail.

As best shown in FIGS. 4 and 5, right and left track covers 110 and 112, respectively, are pivotally mounted on the vehicle 20. The right flap is moved between an extended water mode position under the right track 62, and a retracted ground mode position (not shown) but equivalent to that indicated by the left flap 112 (FIGS. 4 and 5) which is latched in its inoperative position below the bottom planing floor 32 of the vehicle.

The right track cover 110 includes an elongated central and rear section 114, and an upwardly and forwardly inclined front section 116. The forward inclined section 116 compensates for slight angular changes of the lower run of the right track 62 when in its water mode.

More particularly, a two-piece elongated shaft 120 is journaled in sleeves 122 secured to the bottom planing floor 32 of the vehicle 20. Two elongated sleeves 126 are keyed to the two piece shaft 120 and are connected to the elongated section 114 of the track cover 110 by a plurality of tabs 128 (FIG. 4). A tapered front sleeve 130 is keyed and locked to the two-piece shaft 120 and is welded at an appropriate angle to the forward incline section 116. The front and rear sleeves 130,132 are tapered to minimize drag when the vehicle is propelled through the water.

Although the track cover 110 and 112 are illustrated as having upwardly angled front end portions, it will be understood that the angled portions need not be provided for vehicles that have drive sprocket 66 (FIG. 2) and idler sprocket 68 that have diameters that are substantially equal to the diameters of the roadwheel 70.

The right and left track covers 110,112 are pivoted between the land mode and water mode preferably by reversible waterproof motors 134,134a (FIGS. 5 and 6) which may be electric motors, each having a case 136 and a double ended splined shaft 138. Each motor 134 is secured within a housing 140 (FIG. 6) having end plates 142 through which the shaft extends. The central section 114 of the track cover 110 is welded to the housing 140, and the splined end portions of the shaft are journaled in brackets 144 rigidly secured to the vertical wall 30 (FIG. 4) of the vehicle. The splined end portions of the motor shaft 138 are fitted within mating splined portions of the two-piece shaft 120. The reversible motor 134 may be actuated to move the right chine flap 110 between its water mode as illustrated in FIGS. 2 and 3, and a stowed land mode in alignment with a chine flap 112 as best shown in FIGS. 4 after the flap 110 is rotated 180°.

A plurality of electrically or hydraulically actuated latches 148 having T-shaped latch arms 150 are actuated between their flap locking positions illustrated in FIGS. 4 and 5, and open positions at which time the T-shaped arms 150 are rotated 90°. Having reference to FIGS. 4 and 5, it will be noted that when the track covers are in their water mode underlying the tracks, the flaps extend a considerable transverse distance outwardly of the tracks thereby considerably increasing the planing surface of the amphibious vehicle 20.

A pair of bow covers 154,156 are illustrated in FIGS. 3–5 with the bow cover 154 associated with the right track 62 being shown in operative track covering position, and the bow cover 156 associated with the left track 60 being shown in its inoperative stowed position.

Each bow cover 156,154 includes a flat plate 158 having a beveled end portion 160, which engages the front section 116 (FIG. 3) of the associated chine flaps 110,112. Two inner walls 162 define a channel which minimizes turbulence of the water by being adjacent the forward tapered sleeves 130 when in operative position as illustrated in FIGS. 3–6 thereby minimizing drag when the vehicle is propelled at high speeds through the water. The forward end of each cover plate 158 have collars 164,166 removably secured thereto which are secured to the ends of associated spline shafts of a reversible motor 170 that has its housing rigidly secured to the tapered bottom wall 56 at the front end portion of the amphibious vehicle.

As best shown in FIGS. 1–4, a right hydrofoil assembly 172 includes an inline water jet propulsion module 174 which is rigidly secured between a streamline support leg 176 and a water engaging hydrofoil 178. The longitudinal axes of the supporting leg 176 and the hydrofoil 178 are angled about 90° from each other as indicated in FIG. 2.

As illustrated in FIGS. 1 and 10, the right hydrofoil assembly 172 is raised and lowered between its land mode illustrated in FIG. 1 and its water mode illustrated in FIG. 2 by a waterproof electric or hydraulic motor 180. The motor 180 (FIG. 10) includes a case 182 that is secured within a tubular housing 184 having end plates 186 through which splined end portions of a motor shaft 188 extends. The splined end portions engage mating splines in brackets 190, which brackets are secured to the right side wall 30 of the vehicle 20.

The streamline supporting leg 176 (FIG. 11) is rigidly secured to the tubular housing 184, and parabolic end caps 192 are connected to the bracket 190. Thus, energization of the motor 180 in one direction causes the hydrofoil 178 to move into water mode (FIG. 2) while energization of the motor in the opposite direction causes the hydrofoil to be raised out of the water into its land mode as indicated in FIG. 1.

As best shown in FIG. 1, when the hydrofoil assembly is in the land mode, the right and left water propulsion modules 174 and 174a are positioned along the sides of angle portions 34 and 33, respectively, thus minimizing the total width of the amphibious vehicle 20 when in the land mode. It will also be noted that the right hydrofoil assembly 172 is spaced forwardly of the left hydrofoil assembly 172a and that both hydrofoil assemblies are mounted on the rear half of the vehicle.

When the hydrofoil assemblies 172,172a are in their lowered water mode positions as shown in FIG. 2 and the right side of FIG. 5, it will be noted that the elongated central sections 114 of the right and left chine flaps 110 have recesses 194,194a for receiving the associated support legs 176,176a, respectively.

The right and left hydrofoil assemblies are both locked in their water mode by latch mechanisms 196 (FIG. 11). Only the right latch mechanism will be described in detail. When the right hydrofoil assembly 172 is in its water mode, the latch mechanism 196 (FIGS. 4 and 11) cooperates with the right track cover 110. Each latch mechanism 196 comprises a fixed hook 200 (FIG. 11) welded to the hollow support leg 176. A pivotable hook 202 is journaled in a bracket 204 and has a leg 206 which projects through the slot 198 and engages an abutment 205 on the track cover 110 when in the illustrated locking position. Power means such as an actuator or cylinder 208 is secured to the hollow supporting leg 176 and has its actuating element coupled to the lever 202 which is resiliently urged downwardly to movably maintain the latching mechanism 196 in its illustrated locked position. The actuator or cylinder is actuated by control means within the amphibious vehicle when it is desired to release the hydrofoil assembly 172.

A modified form of a track covering system 216 is illustrated in FIG. 12; and the general type of track shoe 218 used on the amphibious hydrofoil vehicle 20 is illustrated in FIG. 13. The track shoes 218 are connected together by conventional pins 217 (FIG. 12), and each track shoe has openings 220 therein. Since both track covering systems 216 are the same, only the right system will be described in detail.

Having reference to FIG. 12, a conventional spring return reel 222 includes a shaft 224 that is journaled in side walls 226 (only one being shown) which are connected together at their forward ends by a lower plate 228. A shaft 229 is secured to the associated side wall 30 of the vehicle and pivotally supports the reel 222 which is partially received in a pod 230. The pod covers a portion of the upper run of the associated track assembly 62. A hydraulic cylinder 231 is pivotally connected to the adjacent side wall of the vehicle by a first connector 232 and to the side walls 226 of the reel 222 by a second connector 234. One end of a flexible belt 236 is rigidly secured to the reel, and angled metal hooks 238 (only one being shown) are secured to the other end of the belt 236.

When the vehicle 20 is floating in water and it is desired to pull the flexible belt tightly over the forward end and the lower run of the track 62, the hydraulic cylinder 231 is retracted thereby lowering the reel 222 causing the angled hook 238 to enter the openings 220 in one of the track shoes 218. The track is then driven in a forward direction as indicated by the arrow in FIG. 12 causing the belt 236 to firmly wrap around the front portion of the track 62, and the lower run thereof, and at least the lower portion of the rear end of the track at which time the movement of the track is stopped by the operator.

When it is desired to wind the flexible belt 236 onto the reel 222, the track is driven in the opposite direction, and the hydraulic cylinder 231 is extended to raise the reel 222 to its solid line position. The reel spring (not shown) then rewinds the flexible belt 236 into the reel. When the hooks 238 are positioned immediately adjacent to the reel, diagonal lower forward edge 240 of the hooks are cammed out of the opening 220 by the next forward track pin thereby releasing the hooks from the track.

Conventional hydraulic, electric and/or manual controls (not shown) may be operated for actuating power means (not shown) for driving the left track 60 and right track 62 at the desired forward or reverse speeds.

Also, conventional electric, hydraulic, and/or manual controls are provided for actuating the motors 180,180a (FIG. 5) for moving the hydrofoils 172,172a between their land mode illustrated in FIG. 1 and their water mode illustrated in FIG. 2.

The right and left track covers 110,112 (FIGS. 2, 4 and 5) may be moved between their land mode illustrated by the right side of the vehicles in FIGS. 4 and 5, and their water mode illustrated by the left side of the vehicle in FIGS. 4 and 5 by activating motors 134 and 134a. After the track covers 110,112 have been moved into their water mode, the right and left power means 208 (only one shown in FIG. 11) are activated to lock the hydrofoil assemblies 172,172a in their water mode as shown in FIG. 2; and the bow flaps 154,156 are moved by motors 170 to their water mode positions as shown in FIG. 3.

When converting from the water mode to the land mode the above described procedure is reversed and the track covers 110,112 are locked in their inoperative land mode positions by actuating the latches 148 as shown by the left track cover 112 in FIG. 4.

In the usual operation of the hydrofoil vehicle of the present invention as a tracked military assault vehicle 20, a plurality of vehicles are unloaded from transport ships located more than about twenty miles from the beaches to be assaulted and out of sight of enemy guns. The vehicles are loaded with troops and/or supplies, and are transferred into the water. Each vehicle 20 is then placed in the water mode as illustrated in FIG. 2, and the inline water jet propulsion modules 174,174a are placed in operation for driving the vehicle in excess of 20 miles per hour for delivering the troops to shore within about an hour so that the troops will arrive in good physical condition for combat. The high water-speed of the vehicle 20 and accordingly the shorter time which the vehicle is in water, minimizes the chance, of the vehicle being destroyed by enemy fire. Directional control may be obtained by varying the speed of the right and left linear flow water jet propulsion modules.

Prior to reaching the beach, the vehicle driver actuates controls which convert the vehicle from the water mode of FIG. 2 to the land mode of FIG. 1. While in the land mode but still in the water, the operator drives the tracks 60,62 in a forward direction and operates the low waterspeed jets 42 and 43 which propels the vehicle a short distance to the beach at about 8 miles per hour. When on land, the vehicle can travel about 45 miles per hour to a protected location for unloading the troops and supplies.

From the foregoing description it is apparent that the amphibious hydrofoil vehicle of the present invention is a tracked vehicle which may be converted between a land mode and a water mode for transporting troops or the like from ship-to-shore at waterspeeds of in excess of 20 miles per hour when propelled by the water jet propulsion modules; a waterspeed of about 8 miles per hour is achieved when being propelled the final short distance in shallow water by low speed water jets 42 and 43 and the tracks of the vehicle to shore, and being driven about 45 miles per hour on shore when the vehicle is in the land mode.

Although the best mode contemplated for carrying out the present invention has been shown and described, it will be apparent that modification and variation may be made without departing from what is regarded to be the subject matter of the invention.

What is claimed is:

1. A power driven amphibious vehicle having front and rear ends and a longitudinal axis, comprising:
    power driven ground engaging means for propelling the vehicle when supported on land;
    a power driven linear flow water jet propulsion module on each side of said vehicle and spaced equal distances from said axis for propelling said vehicle through water; and
    means for moving each of said power driven linear flow water jet propulsion modules about axes parallel to said longitudinal axis between positions below the level of said ground engaging means when operating in a water mode and above the level of the lowermost portion of said ground engaging means when the vehicle is operating in a land mode for propelling the vehicle while in water and while on land.

2. A power driven amphibious vehicle comprising:
    power driven ground engaging means in the form of a pair of endless tracks for propelling the vehicle when supported on land;
    at least one power driven linear flow water jet propulsion module on said vehicle for propelling said vehicle through water;
    means for moving said at least one power driven linear flow water jet propulsion module below the level of said ground engaging means when operating in a water mode and above the level of the lowermost portion of said ground engaging means when the vehicle is operating in a land mode for propelling the vehicle while in water and while on land; and
    a right and left hydrofoil assembly, each hydrofoil assembly being movably mounted on said amphibious vehicle for movement about longitudinal axes parallel to the longitudinal side walls of said amphibious vehicle between a lower position within the water for elevating said amphibious vehicle when driven through the water, and a retracted position above said lowermost position of said ground engaging means when the vehicle is in said land mode.

3. An apparatus according to claim 2 and additionally comprising track cover means which are movably connected to opposite sides of said amphibious vehicle, power means for moving said track covering means below said associated endless tracks for minimizing water friction when operating in said water mode, and for moving said track cover means away from said associated endless tracks for exposing said endless tracks when in said land mode.

4. An apparatus according to claim 3 and additionally comprising latch means for latching said track covering means to said associated hydrofoil assembly when said amphibious vehicle is in said water mode.

5. An apparatus according to claim 4 and additionally including bow flaps movable into an inoperative position away from said endless tracks when said amphibious vehicle is on said land, and movable to an operative position shielding forward end portions of said tracks when in the water.

6. An apparatus according to claim 4 and additionally comprising means for moving lower runs of said endless tracks upwardly a short distance prior to converting the amphibious vehicle into said water mode.

7. An apparatus according to claim 2 wherein each of said endless tracks includes a plurality of track shoes each having at least one hole therein, and wherein each track covering means comprises; a spring return reel pivotally mounted on said vehicle; reel actuating power means for moving each spring return reel between a raised inoperative position and a lowered operative position; flexible belt means each having one end connected to an associated reel; means defining at least one angled metal hook connected to the other end of associated ones of said flexible belt means; each spring return reel being pivoted to said lower operative position and each endless track being driven in a forward direction for effecting engagement of said angled metal hook in associated hole in said associated endless track and thereafter moving each associated one of said belts into firm engagement with and encompassing the lower portion of the associated endless track; and each spring return reel being pivoted to said raised inoperative position and said associated endless tracks being driven in a reverse direction causing said associated angled metal hook to raise out of said associated hole in said endless track when said at least one hook reaches said reel.

8. A power driven amphibious vehicle comprising;
    power driven ground engaging means for propelling the vehicle when supported on land;
    at least one power driven linear flow water jet propulsion module on said vehicle for propelling said vehicle through water;
    means for moving said at least one power driven linear flow water jet propulsion module below the level of said ground engaging means when operating in a water mode and above the level of the lowermost portion of the ground engaging means when the vehicle is operating in a land mode for propelling the vehicle while in water and while on land;
    a right and left hydrofoil assembly, each hydrofoil assembly including a support leg rigidly secured to an associated one of said power driven linear flow water jet propulsion modules and to associated hydrofoils and being movably mounted on said amphibious vehicle for movement between a lower position within the water for elevating said amphibious vehicle when driven through the water, and a retracted position above said lowermost position of said ground engaging means when said vehicle is in said land mode;

said at least one power driven linear flow water jet propulsion module being connected between said support leg and said hydrofoil for propelling the vehicle through water when in said lower position.

9. An apparatus according to claim 8 wherein said hydrofoils of said right and left hydrofoil assemblies is positioned over the top of the vehicle when in said land mode.

10. An apparatus according to claim 9 wherein said right and left hydrofoils of said hydrofoil assemblies are spaced different distances from the forward end of the vehicle for lying side-by-side when in the land mode.

11. A power driven amphibious vehicle comprising:
power driven ground engaging means in the form of a pair of endless tracks for propelling the vehicle when supported on land;
at least one power driven linear flow water jet propulsion module on said vehicle for propelling said vehicle through water;
means for moving said at least one power driven linear flow water jet propulsion module below the level of said ground engaging means when operating in a water mode and above the level of the lowermost portion of said ground engaging means when the vehicle is operating in a land mode for propelling the vehicle while in water and while on land; and
a right and left hydrofoil assembly, each hydrofoil assembly being movably mounted on said amphibious vehicle for movement about longitudinal axes parallel to the longitudinal side walls of said amphibious vehicle between a lower position within the water for elevating said amphibious vehicle when driven through the water, and a retracted position above said lowermost position of said ground engaging means when the vehicle is in said land mode;
said right and left hydrofoil assemblies being pivotally mounted only on the rear half of the amphibious vehicle and about axes parallel to a longitudinal axis of the amphibious vehicle.

12. A power driven vehicle for rapidly transporting personnel and supplies from a transport ship to shore;
means defining right and left hydrofoil assemblies each movably attached to the vehicle and each including a support leg, a hydrofoil, and a linear flow water jet propulsion module;
first power means for moving said right and left hydrofoil assemblies between a land mode and a water mode; and
second power means on said vehicle for driving said linear flow water jet propulsion modules for moving said vehicle at least 20 miles per hour when in said water mode.

13. A power driven vehicle according to claim 12 wherein said vehicle is an amphibious vehicle.

14. A power driven vehicle according to claim 13 wherein said amphibious vehicle receives troops and supplies from the transport ship and delivers the troops and supplies on shore after the hydrofoil assemblies have been moved into said land mode.

15. An apparatus according to claim 13 wherein said amphibious vehicle is a tracked vehicle and is propelled a majority of the distance between ships and the shore by said linear flow water jet propulsion modules at a rate of about 20 miles per hour when in said water mode and by driving tracks of said power driven amphibious vehicle when in said land mode for moving said amphibious tracked vehicle at about 8 miles per hour when in shallow water and up to about 45 miles per hour when on land.

16. An apparatus according to claim 15 and additionally comprising means on said amphibious tracked vehicle movable between a first position underlying said vehicle tracks when said amphibious vehicle is supported in water for minimizing water friction, and a second position spaced from said tracks for allowing said tracks to propel said tracked amphibious vehicle when supported on land.

17. An apparatus according to claim 15 and additionally comprising track covers connected to said amphibious tracked vehicle, and third power means for moving said track covers below said vehicle tracks when said amphibious vehicle is in said water mode for reducing drag when said amphibious vehicle is being propelled through water.

18. An apparatus according to claim 17 and additionally comprising bow covers connected to said amphibious tracked vehicle, and fourth power means for moving said bow covers against the associated track covers and in front of said associated track when said amphibious vehicle is in said water mode for reducing drag when said amphibious vehicle is being propelled through the water.

19. An apparatus according to claim 18 and additionally comprising latch means for latching said hydrofoil assemblies to associated ones of said track covers when in said water mode.

20. An apparatus according to claim 19 wherein the tracks of said amphibious tracked vehicle comprises: a plurality of road wheels; resilient means for urging said road wheels downwardly; and means for raising and locking said road wheels in a raised position when said amphibious tracked vehicle is in its water mode.

21. An apparatus according to claim 20 wherein said road wheels are raised a short distance for minimizing drag when in said water mode.

22. An apparatus according to claim 12 wherein said vehicle is directionally controlled when in said water mode by varying the speed of the right and left linear flow water jet propulsion modules.

23. An apparatus according to claim 12 wherein said amphibious vehicle is a tracked vehicle, and additionally comprising transition water jets mounted on right and left sides of said vehicle adjacent a rear end thereof for assisting in steering said vehicle.

24. An apparatus according to claim 12 and additionally comprising a bottom planing hull on said amphibious vehicle.

25. A power driven vehicle for rapidly transporting personnel and supplies from a transport ship to shore;
means defining right and left hydrofoil assemblies each movably attached to the vehicle and each including a supporting leg, a hydrofoil, and a linear flow water jet propulsion module;
first power means for moving said right and left hydrofoil assemblies between a land mode and a water mode;

second power means on said vehicle for driving said linear flow water jet propulsion modules for moving said vehicle at least 20 miles per hour when in said water mode;

said vehicle being an amphibious vehicle;

said amphibious vehicle being a tracked vehicle and is propelled a majority of the distance between ships and the shore by said linear flow water jet propulsion modules; said amphibious vehicle being driven by tracks on said power driven amphibious vehicle when in said land mode for moving said amphibious tracked vehicle at about 8 miles per hour when in shallow water and up to about 45 miles per hour when on land; track covers connected to said amphibious tracked vehicle,.

third power means for moving said track covers below said tracks when said amphibious vehicle is in said water mode for reducing drag when said amphibious vehicle is propelled through the water; bow covers connected to said amphibious tracked vehicle, and fourth power means for moving said bow covers against the associated track covers and in front of said associated tracks when said amphibious vehicle is in said water mode for reducing drag when said amphibious vehicle is being propelled through water; wherein said amphibious tracked vehicle includes a planing hull; wherein said fourth power means moves said track covers below said planing hull when said amphibious tracked vehicle is in said land mode; and means for latching said track covers to said planing hull when in said land mode.

* * * * *